J. H. BROWN.
MODE OF ATTACHING HANDLES TO BOILERS OR OTHER VESSELS.
No. 60,337. Patented Dec. 11, 1866.
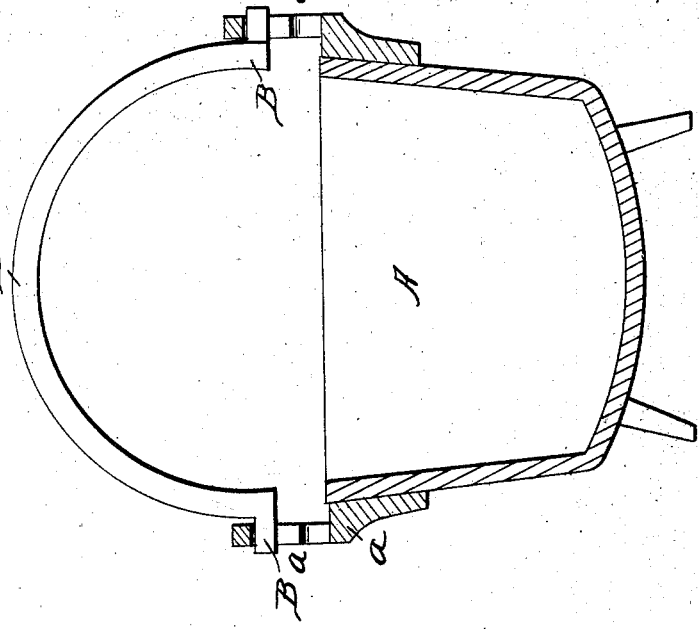
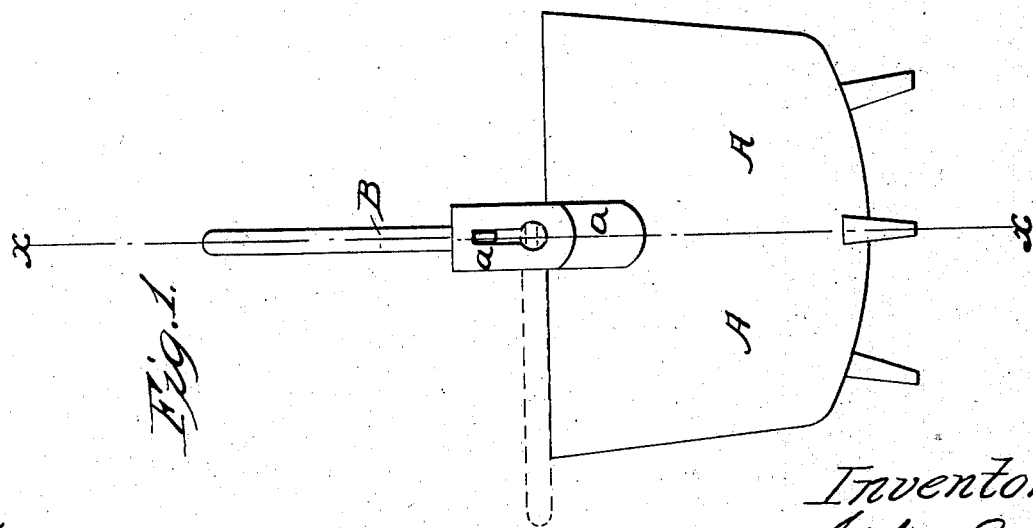
Witnesses:
Inventor:
J. H. Brown

United States Patent Office.

IMPROVED MODE OF ATTACHING HANDLES TO BOILERS AND OTHER VESSELS.

JOHN H. BROWN, OF NEW YORK, N. Y.

Letters Patent No. 60,337, dated December 11, 1866.

The Schedule referred to in these Letters Patent and making part of the same.

TO ALL WHOM IT MAY CONCERN:

Be it known that I, JOHN H. BROWN, of the city and county of New York, have invented a new and improved manner of Attaching Handles to Pots and other Vessels; and I do hereby declare that the following is a full, clear, and exact description thereof, which will enable others skilled in the art to make and use the same, reference being had to the accompanying drawing forming a part of this specification, in which—

Figure 1 represents a side elevation of my improved tea-kettle.

Figure 2 is a vertical cross section of the same, taken on a plane indicated by the line $x\ x$, fig. 1.

Similar letters of reference indicate like parts.

This invention has for its object the attachment of handles to tea-kettles, or other vessels of similar nature, in such a manner that the said handle can be freely turned on its bearings while the pot is standing, but as soon as suspended on the handle it will not be able to swing free, as was heretofore the case, thus preventing the contents from flowing over the side of the pot. Heretofore the handles, which generally consist of a bent iron wire, were simply hung in ears attached to the pot, and would swing free when the pot was standing. When suspended by the handle, the kettle could swing on the same, and, as the contents could thus easily flow over, many accidents occured by scalding. By my invention this difficulty is completeley overcome, as the kettle, when suspended, will be steady on the handle, and consequently all possibility of such accidents will be avoided. To the vessel A, which is otherwise constructed as usual, and of any suitable material, two ears, $a$, are attached, as seen in fig. 2. Each one of these ears is perforated with a slot, the lower end of which is considerably wider than its upper portion. The handle B, which is made of iron wire as usual, is bent in the shape seen in fig. 2. The ends of the handle, which pass through the slots in the ears $a$, are squared in such a manner that when the kettle is standing the ends will be in the lower, widened portion of the slot, and will, therefore, be allowed to turn freely in the same, as seen in red lines in fig. 1. But when the vessel is suspended, in which position it s represented in the drawings, the squared portion of the handles will pass to the upper part of the slot in the ears $a$, where they are prevented from turning, as the slot is there just wide enough to allow the ends of the handle to slide up and down in it.

In this manner it is obvious the kettle will be held steady, and the objects above mentioned will be attained.

I claim, and desire to secure by Letters Patent—

The pear-shaped slots in the ears $a$, in combination with the flattened ends of the bail or handle of the kettle A, constructed and operating substantially as and for the purpose described.

JOHN H. BROWN.

Witnesses:
   WM. DEAN OVERELL,
   ALEX F. ROBERTS